United States Patent
Fardanesh

(10) Patent No.: US 12,531,593 B2
(45) Date of Patent: Jan. 20, 2026

(54) SYNCHRONIZATION OF ZONAL CONTROLLERS USING ULTRA WIDEBAND RADIOS

(71) Applicant: Karma Automotive LLC, Irvine, CA (US)

(72) Inventor: Tony M. Fardanesh, Irvine, CA (US)

(73) Assignee: Karma Automotive, Inc., Irvine, CA (US)

( * ) Notice: Subject to any disclaimer, the term of this patent is extended or adjusted under 35 U.S.C. 154(b) by 1 day.

(21) Appl. No.: 18/584,392

(22) Filed: Feb. 22, 2024

(65) Prior Publication Data

US 2025/0274161 A1 Aug. 28, 2025

(51) Int. Cl.
*H04B 1/7183* (2011.01)
*H04W 56/00* (2009.01)

(52) U.S. Cl.
CPC ...... *H04B 1/7183* (2013.01); *H04W 56/0015* (2013.01)

(58) Field of Classification Search
CPC ............... H04B 1/7183; H04B 1/7163; H04W 56/0015; H04W 56/0065; G01S 7/003; G01S 7/4017; G01S 7/497; G01S 13/931; G01S 17/931; G01S 17/86; G01S 13/865; G01S 13/867; H04L 12/40; H04L 2012/40273
See application file for complete search history.

(56) References Cited

U.S. PATENT DOCUMENTS

| | | | |
|---|---|---|---|
| 11,411,599 B2 * | 8/2022 | Subraveti | H04W 56/00 |
| 2020/0045661 A1 | 2/2020 | Verso et al. | |
| 2021/0159938 A1 | 5/2021 | Subraveti et al. | |
| 2022/0099816 A1 * | 3/2022 | Eber | G01S 11/02 |
| 2022/0289136 A1 * | 9/2022 | Salter | B60R 25/02 |

FOREIGN PATENT DOCUMENTS

| | | |
|---|---|---|
| EP | 4286881 A1 | 12/2023 |
| EP | 4319060 A1 | 2/2024 |

OTHER PUBLICATIONS

International Search Report and Written Opinion relating to Application PCT/US2025/016317, dated May 9, 2025.

* cited by examiner

*Primary Examiner* — Vineeta S Panwalkar
(74) *Attorney, Agent, or Firm* — Honigman LLP; Grant Griffith; Thomas Appledorn

(57) ABSTRACT

A method includes receiving a corresponding synchronization packet captured by a receiving UWB radio associated with a zonal controller of a vehicle. The synchronization packet includes a respective reference timestamp that includes a time of a master clock when a transmitting UWB radio transmitted the corresponding synchronization packet. The method also includes determining a respective received time stamp for the corresponding synchronization packet and obtaining a reference ToF value. The received time stamp includes a time of an internal clock of the zonal controller when the corresponding synchronization packet was captured by the receiving UWB radio. Based on the respective reference timestamp, the respective received time stamp, and the reference ToF value, the method also includes determining the internal clock of the zonal controller is not synchronized with the master clock and adjusting the internal clock to synchronize the internal clock of the zonal controller with the master clock.

26 Claims, 5 Drawing Sheets

SYNCHRONIZATION OF ZONAL CONTROLLERS USING ULTRA WIDEBAND RADIOS

TECHNICAL FIELD

This disclosure relates to synchronization of zonal controllers using ultra wideband radios.

BACKGROUND

Vehicles implementing zonal controller architectures enable the ability to provide efficient power and data distribution around the vehicle, while improving wire cost, weight, and manufacturing costs. The zonal controller is responsible for connecting a high number of actuators and sensors to a central controller, and depending on application distribution, can have a significant role in strategy within a zone. A vehicle can implement multiple zonal controllers each responsible for communicating with a respective different set of actuators and/or sensors. Each zonal controller may have a corresponding internal clock. Having the ability to synchronize the internal clock of each zonal controller with the internal clocks of the other zonal controllers is paramount for ensuring that real-time communications between the zonal controllers is accurate.

SUMMARY

One aspect of the disclosure provides a computer-implemented method executed on data processing hardware that causes the data processing hardware to perform operations that include, for each corresponding synchronization packet in a sequence of one or more synchronization packets transmitted by a transmitting ultra wide band (UWB) radio of a vehicle receiving the corresponding synchronization packet captured by a receiving UWB radio associated with a zonal controller of the vehicle and determining a respective received time stamp for the corresponding synchronization packet. The synchronization packet includes a respective reference timestamp that has a time of a master clock when the transmitting UWB radio transmitted the corresponding synchronization packet. The received time stamp includes a time of an internal clock of the zonal controller when the corresponding synchronization packet was captured by the receiving UWB radio. The operations also include obtaining a reference time-of-flight (ToF) value, and based on the respective reference timestamp for each corresponding synchronization packet, the respective received time stamp for each corresponding synchronization packet, and the reference ToF value, determining the internal clock of the zonal controller is not synchronized with the master clock. The operations also include adjusting the internal clock of the zonal controller to synchronize the internal clock of the zonal controller with the master clock.

Implementations of the disclosure may include one or more of the following optional features. In some implementations, the reference TOF value is obtained based on a fixed distance between the transmitting UWB radio and the receiving UWB radio and a velocity that each corresponding synchronization packet travels between the transmitting UWB radio and the receiving UWB radio. For instance, the velocity that each corresponding synchronization packet travels may be equal to the speed of light.

In some examples, determining the internal clock of the zonal controller is not synchronized with the master clock includes, for each corresponding synchronization packet in the sequence of one or more synchronization packets: determining a respective calculated ToF based on a time difference between the respective reference timestamp and the respective received time stamp; and calculating a respective time offset between the respective calculated ToF and the reference ToF; determining a value of the respective time offset for at least one synchronization packet in the sequence of synchronization packets satisfies an unsynchronized threshold value; and determining the internal clock of the zonal controller is not synchronized with the master clock based on determining the value of the respective time offset for the at least one synchronization packet satisfies the unsynchronized threshold value. In these examples, determining the internal clock of the zonal controller is not synchronized with the master clock may be further based on determining that the value of the respective time offset for a threshold number of the synchronization packets in the sequence of one or more synchronization packets satisfies the unsynchronized threshold value.

The zonal controller may be in communication with a respective group of output devices associated with a specific zone of the vehicle. Here, at least one output device in the respective group of the output devices may include a sensor configured to capture corresponding sensor data and return the corresponding sensor data to the zonal controller. For instance, the sensor may include a radar device, a lidar device, or an image capture device. Furthermore, the respective group of the output devices may include the receiving UWB radio. Additionally or alternatively, at least one output device in the respective group of the output devices may include an actuator that the zonal controller instructs to perform an action.

In some examples, the zonal controller may be in communication with a master controller of the vehicle and another zonal controller of the vehicle, the other zonal controller of the vehicle in communication with another respective group of output devices associated with another specific zone of the vehicle. In these examples, the master controller maintains the master clock and includes the transmitting UWB radio that transmits the sequence of one or more synchronization packets. In these examples, the other respective group of output devices associated with the other specific zone of the vehicle may include another receiving UWB radio associated with the other zonal controller of the vehicle. Here, the another receiving UWB radio is configured to capture each corresponding synchronization packet in the sequence of one or more synchronization packets transmitted by the transmitting UWB radio. Additionally, the master clock may include a respective internal clock of the other zonal controller, while the other respective group of output devices associated with the other specific zone of the vehicle includes the transmitting UWB radio that transmits the sequence of one or more synchronization packets captured by the receiving UWB radio.

Another aspect of the disclosure provides data processing hardware and memory hardware in communication with the data processing hardware that causes the data processing hardware to perform operations that include, for each corresponding synchronization packet in a sequence of one or more synchronization packets transmitted by a transmitting ultra wide band (UWB) radio of a vehicle receiving the corresponding synchronization packet captured by a receiving UWB radio associated with a zonal controller of the vehicle and determining a respective received time stamp for the corresponding synchronization packet. The synchronization packet includes a respective reference timestamp that has a time of a master clock when the transmitting UWB radio transmitted the corresponding synchronization packet. The received time stamp includes a time of an internal clock of the zonal controller when the corresponding synchronization packet was captured by the receiving UWB radio. The operations also include obtaining a reference time-of-flight (ToF) value, and based on the respective reference timestamp for each corresponding synchronization packet, the respective received time stamp for each corresponding synchronization packet, and the reference ToF value, determining the internal clock of the zonal controller is not synchronized with the master clock. The operations also include adjusting the internal clock of the zonal controller to synchronize the internal clock of the zonal controller with the master clock.

This aspect may include one or more of the following optional features. In some implementations, the reference TOF value is obtained based on a fixed distance between the transmitting UWB radio and the receiving UWB radio and a velocity that each corresponding synchronization packet travels between the transmitting UWB radio and the receiving UWB radio. For instance, the velocity that each corresponding synchronization packet travels may be equal to the speed of light.

In some examples, determining the internal clock of the zonal controller is not synchronized with the master clock includes, for each corresponding synchronization packet in the sequence of one or more synchronization packets: determining a respective calculated ToF based on a time difference between the respective reference timestamp and the respective received time stamp; and calculating a respective time offset between the respective calculated ToF and the reference ToF; determining a value of the respective time offset for at least one synchronization packet in the sequence of synchronization packets satisfies an unsynchronized threshold value; and determining the internal clock of the zonal controller is not synchronized with the master clock based on determining the value of the respective time offset for the at least one synchronization packet satisfies the unsynchronized threshold value. In these examples, determining the internal clock of the zonal controller is not synchronized with the master clock may be further based on determining that the value of the respective time offset for a threshold number of the synchronization packets in the sequence of one or more synchronization packets satisfies the unsynchronized threshold value.

The zonal controller may be in communication with a respective group of output devices associated with a specific zone of the vehicle. Here, at least one output device in the respective group of the output devices may include a sensor configured to capture corresponding sensor data and return the corresponding sensor data to the zonal controller. For instance, the sensor may include a radar device, a lidar device, or an image capture device. Furthermore, the respective group of the output devices may include the receiving UWB radio. Additionally or alternatively, at least one output device in the respective group of the output devices may include an actuator that the zonal controller instructs to perform an action.

In some examples, the zonal controller may be in communication with a master controller of the vehicle and another zonal controller of the vehicle, the other zonal controller of the vehicle in communication with another respective group of output devices associated with another specific zone of the vehicle. In these examples, the master controller maintains the master clock and includes the transmitting UWB radio that transmits the sequence of one or more synchronization packets. In these examples, the other respective group of output devices associated with the other specific zone of the vehicle may include another receiving UWB radio associated with the other zonal controller of the vehicle. Here, the another receiving UWB radio is configured to capture each corresponding synchronization packet in the sequence of one or more synchronization packets transmitted by the transmitting UWB radio. Additionally, the master clock may include a respective internal clock of the other zonal controller, while the other respective group of output devices associated with the other specific zone of the vehicle includes the transmitting UWB radio that transmits the sequence of one or more synchronization packets captured by the receiving UWB radio.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
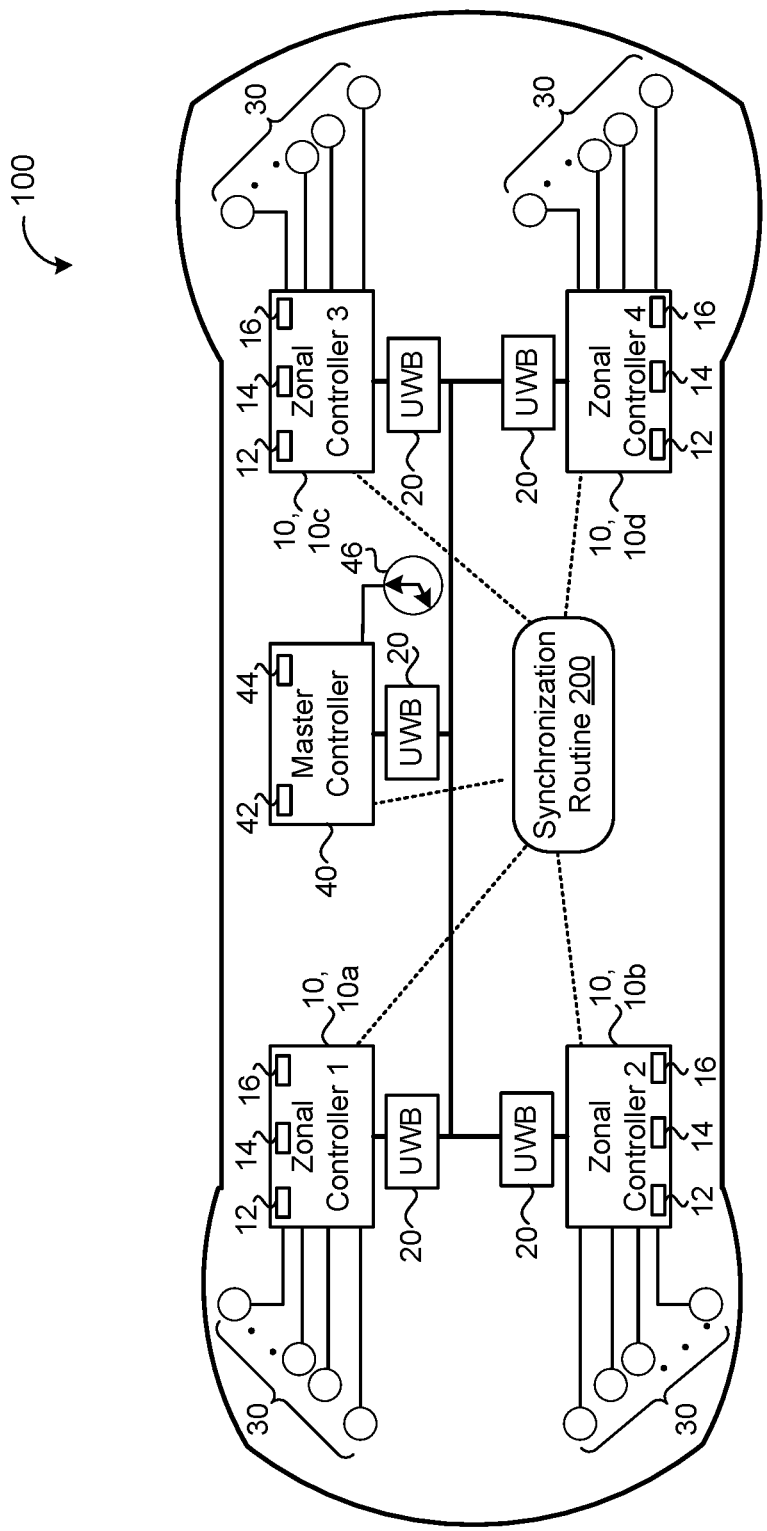
FIG. 1 is schematic view of an example vehicle including a zonal controller architecture.

In contrast to a domain architecture in which vehicle systems are grouped by function, a vehicle implementing a zonal architecture offers a more efficient solution by grouping functions within a vehicle into several zones. Here, each zone in a zonal architecture includes a respective set of devices that are installed in a particular section of the vehicle and are connected to a respective locally installed zonal controller or gateway. The respective set of devices associated with each zone of the zonal architecture and in communication with the respective zonal controller may include sensors and/or actuators such as, without limitation, light devices, air condition, suspension, parking assistance, electronics, parking assistance, batteries, inverters/motors, an engine, power steering components, power braking components, and radios including ultra wideband radios.

Because the zonal controller is close to the devices it controls and/or communicates with, the communication paths (e.g., cables or wireless communications) are relatively short. In the zonal architecture, each zonal controller is connected to a central controller/computer that may have supervisory control over all of the zones and may be responsible for facilitating communications between the vehicle and devices/entities remote from the vehicle. As a result, the communication between zonal controllers and the central controller resembles that of a computer network rather than an automotive harness, thereby enabling the inter-zonal communication to occur over a small, high-speed networking cable that greatly reduces the quantity and size of the cables that must be installed around the vehicle.

Consumers of vehicles demand reliability from their vehicles, expecting all of the functionality of the vehicle to perform flawlessly. For instance, typical conditions exposing vehicle equipment to rain, snow, salt, dirt, and dust, shock and vibration that vehicles experience in everyday use provide challenges to the ability of zonal controllers to perform their functions reliability and accurately. As multiple zonal controllers must communicate with one another to carry out a driving operation in a safe manner, it becomes paramount that the zonal controllers dispersed across different zones of the vehicle are synchronized with one another. In a non-limiting example where a driver desires to change lanes while on a freeway, one zonal controller may receive sensor inputs from a blind spot detection sensor (e.g., proximity sensor, radar or camera) indicating a blind spot event based on detecting another vehicle in a lane the vehicle is actively merging into and communicate the blind spot event to another zonal controller responsible for actuating power steering functionality to automatically urge the vehicle from completing the lane merge so that a collision with the other vehicle is avoided. In this scenario, the zonal controllers must be synchronized with one another, as well as with any intermediary or supervisory master controller, so that the safety maneuver can be performed seamlessly and instantly to avoid the collision. In another safety critical application for a vehicle having onboard camera and LIDAR sensors for object and path detection on a roadway, non-synchronized data collected by these aforementioned sensors may confuse and hinder the ability of the vehicle to properly identify and avoid objects.

The master controller (e.g., gateway controller) and each zonal controller in communication with a respective group of output nodes associated with a specific zone of the vehicle may include respective data processing hardware. Each of the zonal controllers may implement a respective internal clock and a respective ultra wideband (UWB) radio. The master controller may also include a respective internal clock. To enable synchronization of data amongst the master zonal controller and each zonal controller associated with a specific zone of the vehicle, implementations herein are directed toward executing a synchronization routine for maintaining synchronization between the respective internal clock of a zonal controller with a master clock based on synchronization packets transmitted by a transmitting UWB and captured by the respective UWB radio of the zonal controller. Each synchronization packet corresponds to a UWB signal transmitted by the transmitting UWB to the receiving UWB of the zonal controller.

In some implementations, each corresponding zonal controller executes the synchronization routine independently on the respective data processing hardware of the zonal controller. Here, for each corresponding synchronization packet in the sequence of one or more synchronization packets transmitted by the transmitting UWB radio of the vehicle and captured by the respective receiving UWB radio of the corresponding zonal controller, the corresponding zonal controller extracts a respective reference timestamp from the corresponding synchronization packet, determines a respective received timestamp for the corresponding synchronization packet, and obtains a reference time-of-flight (ToF) value. The reference ToF may be stored on memory hardware in communication with the data processing hardware of the zoning controller. As used herein, the reference ToF includes an expected time for a synchronization packet to travel between the transmitting UWB and the respective UWB radio of the zoning controller. The respective reference timestamp for the corresponding synchronization packet may include the time of the master clock when the transmitting UWB radio transmitted the corresponding synchronization packet. The corresponding zonal controller records the respective received time stamp as the time of the respective internal clock when the respective receiving UWB radio captured the corresponding synchronization packet transmitted by the transmitting UWB radio. The synchronization routine executing on the zonal controller determines a calculated ToF for each corresponding synchronization packet based on a time difference between the respective reference timestamp and the respective received timestamp. The synchronization routine may further calculate a respective time offset between the respective calculated ToF and the reference ToF, and thereafter determine that the respective internal clock of the corresponding zonal controller is not synchronized with the master clock when the respective time offset for one or more synchronization packets satisfies an unsynchronized threshold value. For instance, the respective time offset may satisfy the unsynchronized threshold value when the respective time offset is greater than the unsynchronized threshold value, i.e., the calculated ToF determined for a corresponding synchronization packet deviates from the reference ToF by a threshold margin. In some examples, the synchronization routine determines the corresponding zonal controller is not synchronized with the master clock when the respective time offset for a threshold number of consecutive synchronization packets satisfies the unsynchronized threshold value. In other examples, the synchronization routine determines the corresponding zonal controller is not synchronized with the master clock when the respective time offset for a threshold number of synchronization packets satisfies the unsynchronized threshold value over a threshold time period. When the synchronization routine determines the corresponding zonal controller is not synchronized with the master clock, the synchronization routine may adjust the internal clock of the corresponding zonal controller to synchronize the internal clock with the master clock.

In other implementations, a synchronization coordinator executes the synchronization routine to synchronize the respective internal clocks of each zonal controller with a master clock. Here, the master controller may implement the synchronization coordinator and execute the synchronization routine on data processing hardware of the master controller. The master controller may maintain the master clock. In other examples, one of the zonal controllers implements the synchronization coordinator and executes the synchronization routine on the data processing hardware of the corresponding zonal controller, whereby the master clock includes the respective internal clock maintained by the corresponding zonal controller. In these implementations, the synchronization coordinator includes a transmitting UWB that transmits the sequence of synchronization packets to determine whether the respective internal clock of each zonal controller in communication with the synchronization coordinator is synchronized with the master clock. Namely, the respective UWB of each corresponding zonal controller operates as a receiving UWB to capture each corresponding synchronization packet and the corresponding zonal controller determines/records a respective received timestamp for the corresponding synchronization packet. In some examples, for each corresponding synchronization packet transmitted by the transmitting UWB and captured by the respective UWB of the corresponding zonal controller, the corresponding zonal controller communicates the respective received timestamp for the corresponding synchronization packet back to the synchronization coordinator and the synchronization coordinator determines a calculated ToF for the corresponding synchronization packet based on a time difference between a respective reference timestamp and the respective received timestamp. Here, the synchronization controller may store the respective reference time stamp recorded by the master clock for the corresponding synchronization packet at the time when the transmitting UWB radio transmitted the corresponding synchronization packet. The synchronization coordinator may further obtain a respective reference ToF for each corresponding zonal controller that indicates the expected time for a synchronization packet to travel between the transmitting UWB and the respective UWB of the corresponding zonal controller. Intuitively, the respective reference ToF for each corresponding zonal controller is directly proportional to the distance between the respective UWB of the corresponding zonal controller and the transmitting UWB of the synchronization controller. The synchronization routine may further calculate a respective time offset between the respective calculated ToF and the reference ToF, and thereafter determine that the respective internal clock of the corresponding zonal controller is not synchronized with the master clock when the respective time offset for one or more synchronization packets satisfies an unsynchronized threshold value. When the synchronization routine executing on the synchronization coordinator determines that the respective internal clock of the corresponding zonal controller is not synchronized with the master clock, the synchronization routine may cause the synchronization coordinator to send synchronization instructions to the corresponding zonal controller that instruct the corresponding zonal controller to adjust a value of the respective internal clock so that the respective internal clock is synchronized with the master clock. In this manner, the synchronization coordinator may synchronize the respective internal clocks of the zonal controllers with the master clock on an individual basis.

While the example includes the corresponding zonal controllers communicating back their received time stamps and the synchronization coordinator determining each calculated ToF, the present disclosure may additionally or alternatively include each zonal controller also extracting the reference time stamp from each synchronization packet and determining the calculated ToF for each synchronization packet based on the received time stamp and the reference time stamp. Here, each zonal controller may communicate the calculated ToF determined for each synchronization packet back to the synchronization coordinator. Optionally, each zonal controller may access the respective reference ToF flight and determine the respective time offset between the respective calculated ToF and the reference ToF. In this manner, each zonal controller may communicate the respective time offset calculated for each corresponding synchronization packet back to the synchronization coordinator for making the determination of whether or not the respective internal clock of the zonal controller is synchronized with the master clock.

Referring to FIG. 1, in some implementations, a vehicle 100 implements a zonal architecture that includes a plurality of zonal controllers 10, 10a-n for grouping functions within the vehicle into specific zones. Namely, each zonal controller 10 is assigned to a respective zone of the vehicle 100 and is connected to a respective set of components 30 that are installed in or near the respective zone the zonal controller 10 is assigned. In the example shown, each zonal controller 10 is locally installed in the respective zone of the vehicle 100 in which the respective set of components 30 are installed. For instance, a first zonal controller 10a is installed on a front passenger-side zone, a second zonal controller 10b is installed in a front driver-side zone, a third zonal controller 10c is installed in a rear passenger-size zone, and a fourth zonal controller 10d is installed in a rear driver-side zone. Other configurations are possible as well. For instance, a respective zonal controller may be assigned to each one of a front zone including respective components 30 installed on the front of the vehicle, a first side zone including a respective set of components 30 installed on a right side or left side of the vehicle, a second side zone including a respective set of components installed on the other one of the right side or the left side of the vehicle, and a rear zone including a respective set of components 30 installed on a rear of the vehicle. The number of zonal controllers 10 is non-limiting such that the vehicle 100 may include less than four zonal controllers 10 or more than four zonal controllers 10.

The respective set of components 30 associated with each zone of the zonal architecture and in communication with the respective zonal controller 10 may include sensors and/or actuators. For instance, the respective set of components 30 may include, without limitation, sensors, lights, actuators, heating ventilation and air conditioning (HVAC) systems, steering systems, brakes, parking brakes, safety devices (airbag controls devices, vehicle dynamic control (VDC) devices, electronic stability control (ESC) devices, etc.), suspension devices, power windows, power trunks/lift gates, electronics, parking assistance systems, batteries, inverters/motors, an engine, cameras, and communication interfaces. Since each zonal controller 10 is close to the components it controls and/or communicates with, the communication paths (e.g., cables or wireless communications) are relatively short.

In the zonal architecture, each zonal controller 10 is in communication with the other zonal controllers 10 and a master controller 40 that acts as a central controller having supervisory control over all the zones and may be responsible for facilitating communications between the vehicle and devices/entities remote from the vehicle. The zonal controllers 10 and the master controller 40 may communicate with one another via a CAN bus, LIN bus, Ethernet, and/or other communication paths. Wireless communication paths are also possible. Each zonal controller 10 may communicate with the respective set of components 30 via any wired or wireless communication protocol such, as without limitation, CAN, LIN, or Ethernet.

Each zonal controller 10 in the zonal architecture may include respective data processing hardware 12, respective memory hardware 14 in communication with the data processing hardware 12, a respective internal clock 16, and a respective ultra wideband (UWB) radio 20. The memory hardware 14 may store instructions executable on the respective data processing hardware 12 that causes the data processing hardware to perform operations for controlling the functionality of the respective set of components 30. In some examples, each zonal controller 10 is capable of executing a synchronization routine 200 on the data processing hardware 12 for synchronizing the respective internal clock 16 with a master clock 46. Described in greater detail below, the master clock 46 may include an internal clock implemented by the master controller 40 or may include the respective internal clock 16 of another zonal controller 10 the corresponding zonal controller 10 wants to synchronize with.

Figure 2A:
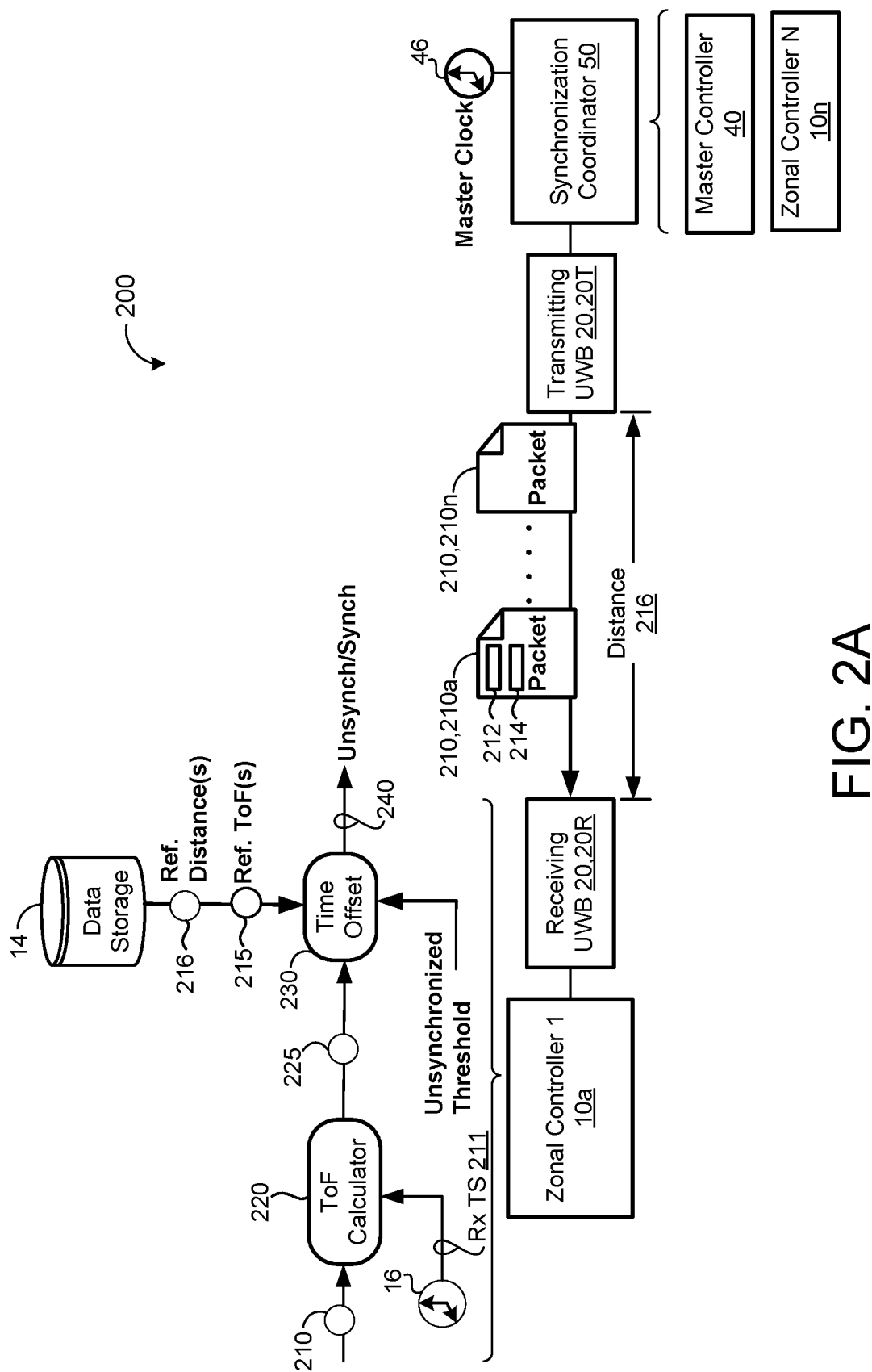
FIG. 2A is a schematic view of a synchronization routine executing on a zonal controller to synchronize an internal clock with a master clock.

Referring to FIG. 2A, in some implementations, the synchronization routine 200 executes on the data processing hardware 12 of a zonal controller 10a for synchronizing the respective internal clock 16 with the master clock 46 based on a sequence of synchronization packets 210, 210a-n transmitted by a transmitting UWB radio 20T associated with a synchronization coordinator and received by the respective UWB radio 20, 20R associated with the zonal controller 10a. More specifically, a synchronization coordinator 50 may implement/maintain the master clock 46 and instruct the transmitting UWB radio 20T to transmit the sequence of one or more synchronization packets 210 for the respective UWB radio 20R associated with the zonal controller 10a to capture. In some examples, the synchronization coordinator 50 includes the master controller 40 and the master clock 46 includes the internal clock implemented by the master controller 40. In these examples, the each other zonal controller 10b-10c in addition to the first zonal controller 10a may also execute the synchronization routine 200 to synchronize their respective internal clocks 16 with the master clock 46 based on the sequence of synchronization packets 210 captured by the respective UWB radio 20 associated with each other zonal controller 10a. In other examples, the synchronization coordinator 50 includes another one of the zonal controllers 10n such that the master clock 46 includes the respective internal clock 16 of the other zonal controller 10n operating as the synchronization coordinator 50.

For each corresponding synchronization packet 210 transmitted by the transmitting UWB radio 20T and captured by the respective UWB radio 20R associated with the zonal controller 10a, the zonal controller 10a receives the corresponding synchronization packet 210 and determines a respective received timestamp 211 for the corresponding synchronization packet 210. Here, the synchronization packet 210 transmitted from synchronization coordinator 50 includes a respective reference timestamp (Ref. TS) 212 that indicates a time of the master clock 46 when the transmitting UWB radio 20T transmitted the corresponding synchronization packet 210. On the other hand, the received time stamp (Rx TS) 211 includes a time of the respective internal clock 16 of the zonal controller 10a when the corresponding synchronization packet 210 was captured by the respective UWB radio 20R associated with the zonal controller 10a. That is, the corresponding zonal controller 10a may record the respective received time stamp 211 as the time of the respective internal clock 16 when the respective receiving UWB radio 20R captured the corresponding synchronization packet 210 transmitted by the transmitting UWB radio 20T.

While executing the synchronization routine 200, the zonal controller 10a also obtains a reference time-of-flight (ToF) value 215. The reference ToF value 215 includes an expected time for a synchronization packet 210 to travel between the transmitting UWB 20T and the respective UWB radio 20R of the zoning controller 10a. The reference TOF value 215 may be based on a fixed distance 216 between the transmitting UWB radio 20T and the receiving UWB radio 20R and a velocity that each corresponding synchronization packet 210 travels between the transmitting UWB radio 20T and the receiving UWB radio 20R. In some examples, the velocity is equal to the speed of light. Accordingly, the reference ToF value 215 may be obtained by multiplying the fixed distance 216 by the velocity (e.g., speed of light). In some implementations, the zonal controller 10a obtains the reference ToF value 215 by look-up or retrieval from the memory hardware 14. Here, the zonal controller 10a may store a reference ToF log that indicates a respective TOF value for the master controller 40 and each other zonal controller. When the synchronization coordinator 50 is a separate module from the master controller 40 and the zonal controllers 10n, the reference ToF log may similarly include the respective ToF value for the synchronization coordinator 50. In this way, the received synchronization packet 210 captured by the receiving UWB radio 20R may include packet information 214 that includes an identifier of the synchronization coordinator 50 and the zonal controller 10a may use the identifier to look-up/retrieve the reference ToF value 215 from the reference ToF log. In other implementations, the synchronization coordinator 50 appends the reference ToF value 215 to the packet information 214 of the synchronization packet 210 such that the zonal controller 10a may simply extract the reference ToF value 215 from the received synchronized packet 210. Optionally, the packet information 214 of the synchronization packet 210 may indicate the fixed distance 216 such that the zonal controller 10a calculated the reference ToF value 215 by multiplying a value for the fixed distance 216 times the speed of light. In yet another example, the fixed distance 216 separating the zonal controller 10a and the synchronization coordinator 50 is stored in the data storage 14 and the zonal controller 10a determines the reference ToF value 215 by retrieving the fixed distance 216 from the data storage 14 (i.e., using the identifier in the packet information 214) and multiplying the fixed distance 216 times the speed of light.

Based on the respective reference timestamp 212 for each corresponding synchronization packet 210, the respective received time stamp 211 for each corresponding synchronization packet 210, and the reference ToF value 215, the synchronization routine 200 executing on the zonal controller 10a may output a synchronization decision 240 indicating whether or not the respective internal clock 16 of the zonal controller 10a is synchronized with the master clock 46. In scenarios when the routine 200 determines the respective internal clock 16 is not synchronized with the master clock 46, the synchronization routine 200 may adjust the respective internal clock 16 of the zonal controller 10a to synchronize the internal clock with the master clock 46. For each synchronization packet 210 captured by the zonal controller 10a, the synchronization routine 200 determines a respective calculated ToF value 225 and then calculates a respective time offset 230 between the respective calculated ToF value 225 and the reference ToF value 215. Here, a ToF calculator 220 may determine the respective ToF value 225 for the corresponding synchronization packet 210 based on a time difference between the respective reference timestamp 212 and the respective received timestamp 211.

Implementations herein are directed toward the synchronization routine 200 outputting a synchronization decision 240 that indicates the respective internal clock 16 of the zonal controller 10a is not synchronized with the master clock 46 based on determining the value of the respective time offset 230 for at least one of the synchronization packets 210 captured by the receiving UWB radio 20R satisfies an unsynchronized threshold value. In some examples, the routine 200 determines the internal clock 16 of the zonal controller 10a is not synchronized with the master clock 46 by determining that the value of the respective time offset 230 for a threshold number of the synchronization packets 210 in the sequence of one or more synchronization packets 210 captured by the receiving UWB radio 20R satisfies the unsynchronized threshold value. Here, the threshold number of synchronization packets 210 may include a threshold number of consecutive synchronization packets 210 where the value of the respective time offset 230 satisfies the unsynchronized threshold value. In other scenarios, the threshold number of synchronization packets 210 may include a threshold number of synchronization packets 210 within a predefined time range where the value of the respective time offset 230 satisfies the unsynchronized threshold value.

Figure 2B:
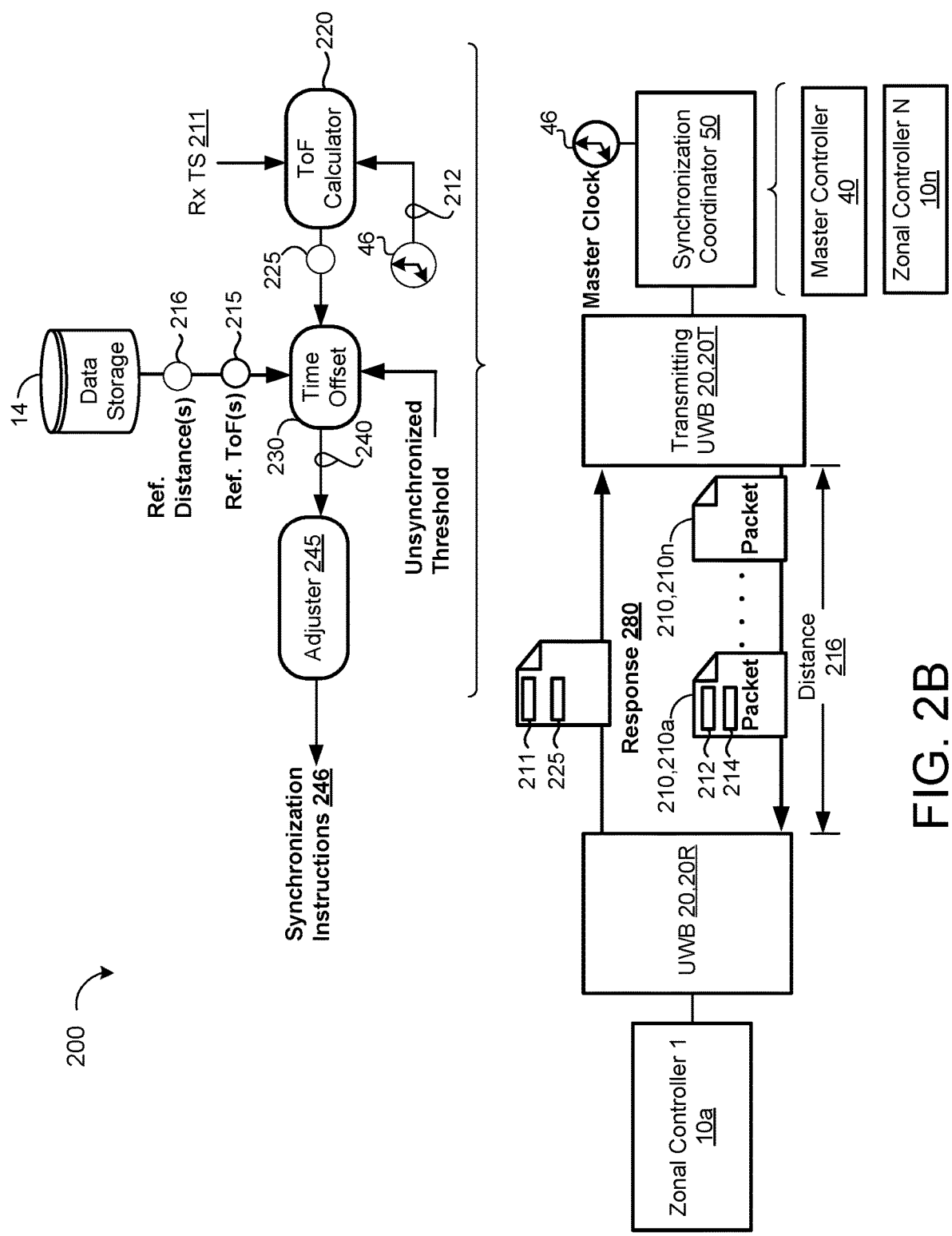
FIG. 2B is a schematic view of a synchronization routine executing on a synchronization coordinator to synchronize an internal clock of a zonal controller with a master clock.

Referring to FIG. 2B, in some implementations, the synchronization routine 200 instead executes on the data processing hardware 12 of the synchronization coordinator 50 for synchronizing the respective internal clock 16 of the zonal controller 10a with the master clock 46. As described above with reference to FIG. 2A, the synchronization coordinator 50 may include the master controller 40, another one of the zonal controllers 10n, or a standalone module. For each of synchronization packet of the sequence of one or more synchronization packets 210, 210a-n transmitted by the transmitting UWB radio 20T associated with the synchronization coordinator 50 and captured by the respective UWB radio 20R associated with the zonal controller 10a, the zonal controller 10a determines the respective received timestamp 211 for the corresponding synchronization packet 210 that indicates the time of the internal clock 16 of the zonal controller 10a when the corresponding synchronization packet 210 was captured by the respective UWB radio 20R. The synchronization routine 200 may instruct the transmitting UWB radio 20T to transmit the synchronization packets 210 during a scheduled synchronization session or may transmit the synchronization packets 210 continuously during operation of the vehicle. In the example of FIG. 2B, the zonal controller 10a transmits, via the respective UWB radio 20R (or other communication means), a synchronization response 280 responsive to receiving one synchronization packets 210 and determining the respective received time stamps 211. In some examples, the zonal controller 10a transmits a corresponding response 280 for each synchronization packet 210. In other examples, the zonal controller 10a transmits a single response 280 for a group of two of more synchronization packets 210 received by the zonal controller 10a.

In some implementations, the synchronization response 280 includes the respective received time stamp 211 determined by the zonal controller 10a for each of one more corresponding synchronization packets 210 captured by the respective UWB radio 20R associated with the zonal controller 10. The synchronization controller 50 executing the synchronization process may determine (e.g., via ToF calculator 220) a calculated ToF value 225 for the corresponding synchronization packet 210 based on the respective received time stamp 211 and the respective reference timestamp 212 that includes a time of the master clock 46 when the transmitting UWB radio 20T transmitted the corresponding synchronization packet 210. Optionally, the zonal controller 10a may determine the calculated ToF value 225 for each corresponding synchronization packet 210 locally as described above with reference to FIG. 2A and then include the calculated ToF value 225 in the synchronization response 280 transmitted to the synchronization controller 50.

Similar to the zonal controller 10a in FIG. 2A, the synchronization controller 50 may obtain a reference ToF value 215 that includes an expected time for a synchronization packet 210 to travel between the transmitting UWB 20T and the respective UWB radio 20R of the zoning controller 10a. As described in the preceding paragraphs, the reference ToF value 215 may be based on the fixed distance 216 between the transmitting UWB radio 20T and the receiving UWB radio 20R and a velocity (e.g., speed of light) that each corresponding synchronization packet 210 travels between the transmitting UWB radio 20T and the receiving UWB radio 20R. In some implementations, the synchronization coordinator 50 obtains the reference ToF value 215 by look-up or retrieval from the memory hardware 14. Here, the synchronization coordinator 50 may store a reference ToF log that indicates a respective ToF value each other zonal controller. When the synchronization coordinator 50 is a separate module from the master controller 40 and the zonal controllers 10n, the reference ToF log may similarly include the respective ToF value for the synchronization coordinator 50. In this way, the synchronization response 280 from the zonal controller 10a (and from other zonal controllers 10 the synchronization coordinator 50 may be synchronizing with separately or simultaneously) may include an identifier of the zonal controller 10a that the synchronization coordinator 50 may use look-up/retrieve the reference ToF value 215 for the zonal controller 10a.

Based on one or more synchronization responses 280 received from the zonal controller 10 while executing the synchronization routine 200, the synchronization coordinator 50 may output a synchronization decision 240 indicating whether or not the respective internal clock 16 of the zonal controller 10a is synchronized with the master clock 46. In scenarios when the routine 200 determines the respective internal clock 16 is not synchronized with the master clock 46, the synchronization routine 200 may cause the synchronization coordinator 50 to transmit synchronization instructions 246 to the zonal controller 10a that cause the zonal controller 10a to adjust the respective internal clock 16 of the zonal controller 10a to synchronize the internal clock with the master clock 46. The synchronization instructions 246 may be transmitted by the transmitting UWB 20T and received by the respective UWB 20R associated with the zonal controller 10a. Based on the one or more synchronization responses 280 received from the zonal controller 10a at the synchronization coordinator 50, the synchronization routine 200 determines a respective calculated ToF value 225 for each corresponding synchronization packet 210 and then calculates a respective time offset 230 between the respective calculated ToF value 225 and the reference ToF value 215.

Based on one or more synchronization responses 280 received from the zonal controller 10 while executing the synchronization routine 200, the synchronization coordinator 50 may output a synchronization decision 240 that indicates the respective internal clock 16 of the zonal controller 10a is not synchronized with the master clock 46 based on determining the value of a respective time offset 230 for at least one of the synchronization packets 210 captured by the receiving UWB radio 20R satisfies an unsynchronized threshold value. In some examples, the routine 200 determines the internal clock 16 of the zonal controller 10a is not synchronized with the master clock 46 by determining that the value of the respective time offset 230 for a threshold number of the synchronization packets 210 in the sequence of one or more synchronization packets 210 captured by the receiving UWB radio 20R satisfies the unsynchronized threshold value. Here, the threshold number of synchronization packets 210 may include a threshold number of consecutive synchronization packets 210 where the value of the respective time offset 230 satisfies the unsynchronized threshold value. In other scenarios, the threshold number of synchronization packets 210 may include a threshold number of synchronization packets 210 within a predefined time range where the value of the respective time offset 230 satisfies the unsynchronized threshold value.

Figure 3:
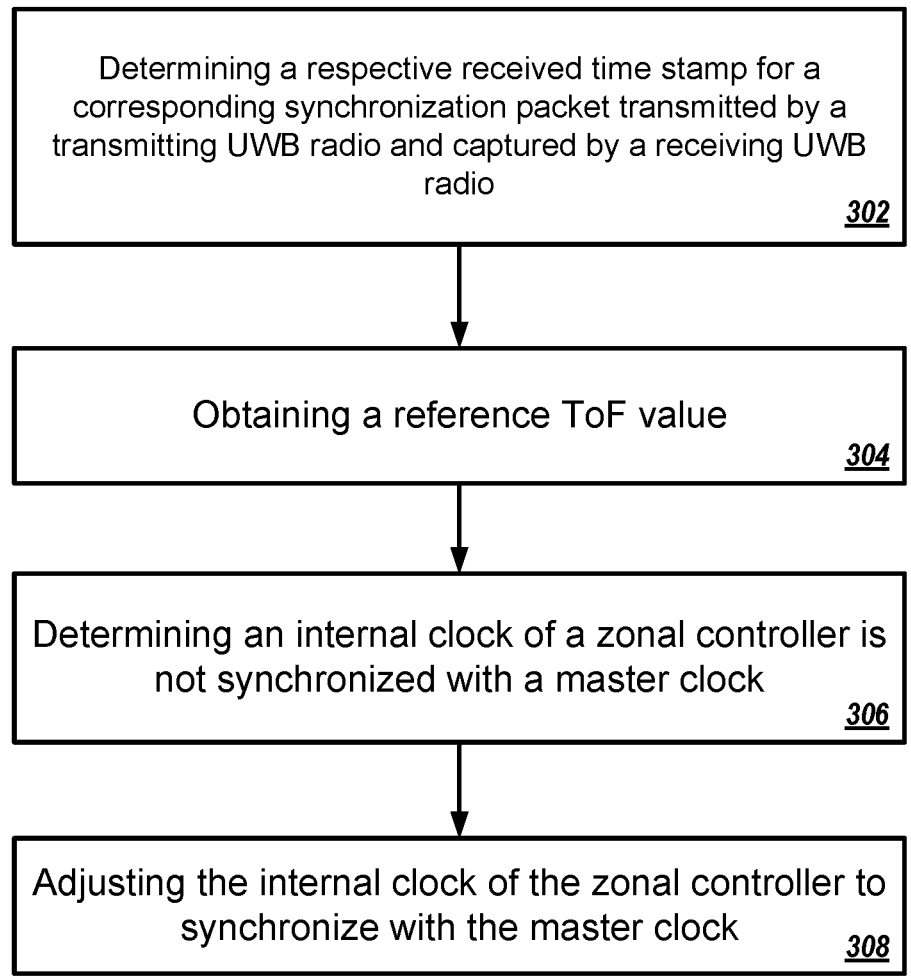
FIG. 3 is a flowchart of an example arrangement of operations for a method of synchronizing an internal clock of a zonal controller with master clock.

FIG. 3 is a flowchart for an exemplary arrangement of operations for a method 300 of synchronizing an internal clock 16 of a zonal controller 10 with a master clock 46. The method 300 may execute on the data processing hardware 12 of one of the zonal controllers 10 or on the data processing hardware 42 of the master controller 40 of FIG. 1. For each corresponding synchronization packet 210 in a sequence of one or more synchronization packets 210 transmitted by a transmitting ultra wide band (UWB) radio 20T of a vehicle 100, the method 300 includes, at operation 302, receiving the corresponding synchronization packet 210 captured by a receiving UWB radio 20R associated with the zonal controller 10 and determining a respective received time stamp 211 for the corresponding synchronization packet 210. Here, the synchronization packet 210 includes a respective reference timestamp 212 that includes a time of the master clock 46 when the transmitting UWB radio 20T transmitted the corresponding synchronization packet 210. The received time stamp 211 includes a time of the internal clock 16 of the zonal controller 10 when the corresponding synchronization packet 210 was captured by the receiving UWB radio 20R.

At operation 304, the method 300 includes obtaining a reference time-of-flight (ToF) value 215. The reference ToF value 215 is based on a fixed distance 216 between the transmitting UWB radio 20T and the receiving UWB radio 20R and a velocity that each corresponding synchronization packet 210 travels between the transmitting UWB radio 20T and the receiving UWB radio 20R.

At operation 306, based on the respective reference timestamp 212 for each corresponding synchronization packet 210, the respective received time stamp 211 for each corresponding synchronization packet 210, and the reference TOF value 215, the method 300 includes determining the internal clock 16 of the zonal controller 10 is not synchronized with the master clock 46. At operation 308, the method 300 includes adjusting the internal clock 16 of the zonal controller 10 to synchronize the internal clock 16 of the zonal controller 10 with the master clock 46.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
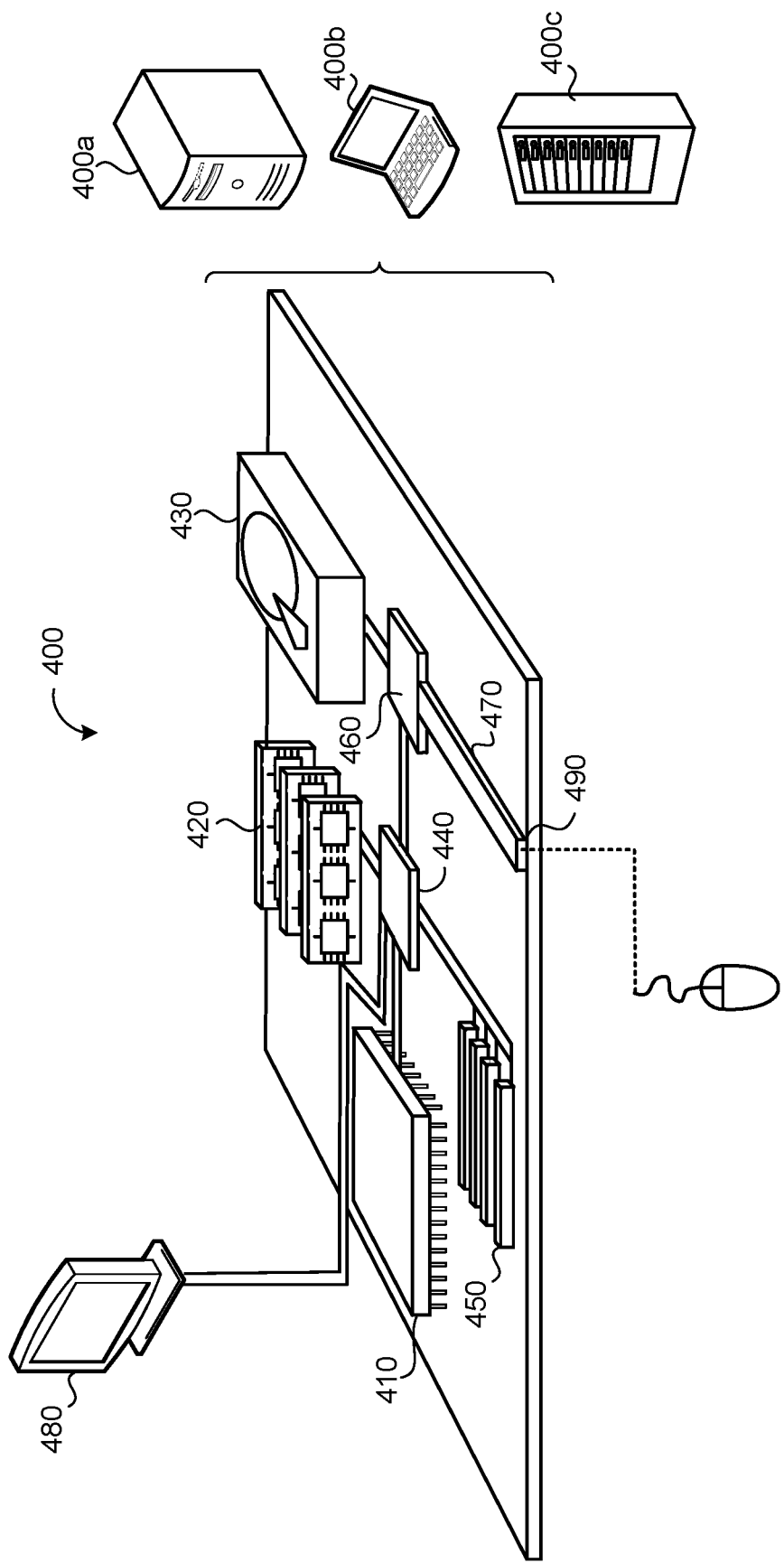
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   for each corresponding synchronization packet in a sequence of one or more synchronization packets transmitted by a transmitting ultra wide band (UWB) radio of a vehicle:
      receiving the corresponding synchronization packet captured by a receiving UWB radio associated with a zonal controller of the vehicle, the synchronization packet comprising a respective reference timestamp that includes a time of a master clock when the transmitting UWB radio transmitted the corresponding synchronization packet; and
      determining a respective received time stamp for the corresponding synchronization packet, the received time stamp comprising a time of an internal clock of the zonal controller when the corresponding synchronization packet was captured by the receiving UWB radio;
   obtaining a reference time-of-flight (TOF) value;
   based on the respective reference timestamp for each corresponding synchronization packet, the respective received time stamp for each corresponding synchronization packet, and the reference TOF value, determining the internal clock of the zonal controller is not synchronized with the master clock; and
   adjusting the internal clock of the zonal controller to synchronize the internal clock of the zonal controller with the master clock,
   wherein the reference TOF value is obtained based on a fixed distance between the transmitting UWB radio and the receiving UWB radio and a velocity that each corresponding synchronization packet travels between the transmitting UWB radio and the receiving UWB radio.

2. The method of claim 1, wherein the velocity that each corresponding synchronization packet travels is equal to the speed of light.

3. The method of claim 1, wherein determining the internal clock of the zonal controller is not synchronized with the master clock comprises:
for each corresponding synchronization packet in the sequence of one or more synchronization packets:
determining a respective calculated ToF based on a time difference between the respective reference timestamp and the respective received time stamp; and
calculating a respective time offset between the respective calculated ToF and the reference ToF;
determining a value of the respective time offset for at least one synchronization packet in the sequence of synchronization packets satisfies an unsynchronized threshold value; and
determining the internal clock of the zonal controller is not synchronized with the master clock based on determining the value of the respective time offset for the at least one synchronization packet satisfies the unsynchronized threshold value.

4. The method of claim 3, wherein determining the internal clock of the zonal controller is not synchronized with the master clock is further based on determining that the value of the respective time offset for a threshold number of the synchronization packets in the sequence of one or more synchronization packets satisfies the unsynchronized threshold value.

5. A computer-implemented method executed on data processing hardware that causes the data processing hardware to perform operations comprising:
for each corresponding synchronization packet in a sequence of one or more synchronization packets transmitted by a transmitting ultra wide band (UWB) radio of a vehicle:
receiving the corresponding synchronization packet captured by a receiving UWB radio associated with a zonal controller of the vehicle, the synchronization packet comprising a respective reference timestamp that includes a time of a master clock when the transmitting UWB radio transmitted the corresponding synchronization packet; and
determining a respective received time stamp for the corresponding synchronization packet, the received time stamp comprising a time of an internal clock of the zonal controller when the corresponding synchronization packet was captured by the receiving UWB radio;
obtaining a reference time-of-flight (TOF) value;
based on the respective reference timestamp for each corresponding synchronization packet, the respective received time stamp for each corresponding synchronization packet, and the reference TOF value, determining the internal clock of the zonal controller is not synchronized with the master clock; and
adjusting the internal clock of the zonal controller to synchronize the internal clock of the zonal controller with the master clock,
wherein the zonal controller is in communication with a respective group of output devices associated with a specific zone of the vehicle.

6. The method of claim 5, wherein at least one output device in the respective group of the output devices comprises a sensor configured to capture corresponding sensor data and return the corresponding sensor data to the zonal controller.

7. The method of claim 6, wherein the sensor comprises a radar device, a lidar device, or an image capture device.

8. The method of claim 5, wherein the respective group of the output devices includes the receiving UWB radio.

9. The method of claim 5, wherein at least one output device in the respective group of the output devices comprises an actuator that the zonal controller instructs to perform an action.

10. The method of claim 5, wherein the zonal controller is in communication with a master controller of the vehicle and another zonal controller of the vehicle, the other zonal controller of the vehicle in communication with another respective group of output devices associated with another specific zone of the vehicle.

11. The method of claim 10, wherein the master controller maintains the master clock and comprises the transmitting UWB radio that transmits the sequence of one or more synchronization packets.

12. The method of claim 11, wherein the other respective group of output devices associated with the other specific zone of the vehicle comprises another receiving UWB radio associated with the other zonal controller of the vehicle, the another receiving UWB radio configured to capture each corresponding synchronization packet in the sequence of one or more synchronization packets transmitted by the transmitting UWB radio.

13. The method of claim 10, wherein:
the master clock comprises a respective internal clock of the other zonal controller; and
the other respective group of output devices associated with the other specific zone of the vehicle includes the transmitting UWB radio that transmits the sequence of one or more synchronization packets captured by the receiving UWB radio.

14. A system comprising:
data processing hardware; and
memory hardware in communication with the data processing hardware, the memory hardware storing instructions that when executed on the data processing hardware cause the data processing hardware to perform operations comprising:
for each corresponding synchronization packet in a sequence of one or more synchronization packets transmitted by a transmitting ultra wide band (UWB) radio of a vehicle:
receiving the corresponding synchronization packet captured by a receiving UWB radio associated with a zonal controller of the vehicle, the synchronization packet comprising a respective reference timestamp that includes a time of a master clock when the transmitting UWB radio transmitted the corresponding synchronization packet; and
determining a respective received time stamp for the corresponding synchronization packet, the received time stamp comprising a time of an internal clock of the zonal controller when the corresponding synchronization packet was captured by the receiving UWB radio;
obtaining a reference time-of-flight (TOF) value;
based on the respective reference timestamp for each corresponding synchronization packet, the respective received time stamp for each corresponding synchronization packet, and the reference TOF value, determining the internal clock of the zonal controller is not synchronized with the master clock; and adjusting the internal clock of the zonal controller to synchronize the internal clock of the zonal controller with the master clock, wherein the reference TOF value is obtained based on a fixed distance between the transmitting UWB radio and the receiving UWB radio and a velocity that each corresponding synchronization packet travels between the transmitting UWB radio and the receiving UWB radio.

15. The system of claim 14, wherein the velocity that each corresponding synchronization packet travels is equal to the speed of light.

16. The system of claim 14, wherein determining the internal clock of the zonal controller is not synchronized with the master clock comprises:
for each corresponding synchronization packet in the sequence of one or more synchronization packets:
determining a respective calculated ToF based on a time difference between the respective reference timestamp and the respective received time stamp; and
calculating a respective time offset between the respective calculated ToF and the reference ToF;
determining a value of the respective time offset for at least one synchronization packet in the sequence of synchronization packets satisfies an unsynchronized threshold value; and
determining the internal clock of the zonal controller is not synchronized with the master clock based on determining the value of the respective time offset for the at least one synchronization packet satisfies the unsynchronized threshold value.

17. The system of claim 16, wherein determining the internal clock of the zonal controller is not synchronized with the master clock is further based on determining that the value of the respective time offset for a threshold number of the synchronization packets in the sequence of one or more synchronization packets satisfies the unsynchronized threshold value.

18. A system comprising:
data processing hardware; and
memory hardware in communication with the data processing hardware, the memory hardware storing instructions that when executed on the data processing hardware cause the data processing hardware to perform operations comprising:
for each corresponding synchronization packet in a sequence of one or more synchronization packets transmitted by a transmitting ultra wide band (UWB) radio of a vehicle:
receiving the corresponding synchronization packet captured by a receiving UWB radio associated with a zonal controller of the vehicle, the synchronization packet comprising a respective reference timestamp that includes a time of a master clock when the transmitting UWB radio transmitted the corresponding synchronization packet; and
determining a respective received time stamp for the corresponding synchronization packet, the received time stamp comprising a time of an internal clock of the zonal controller when the corresponding synchronization packet was captured by the receiving UWB radio;
obtaining a reference time-of-flight (TOF) value;
based on the respective reference timestamp for each corresponding synchronization packet, the respective received time stamp for each corresponding synchronization packet, and the reference TOF value, determining the internal clock of the zonal controller is not synchronized with the master clock; and adjusting the internal clock of the zonal controller to synchronize the internal clock of the zonal controller with the master clock,
wherein the zonal controller is in communication with a respective group of output devices associated with a specific zone of the vehicle.

19. The system of claim 18, wherein at least one output device in the respective group of the output devices comprises a sensor configured to capture corresponding sensor data and return the corresponding sensor data to the zonal controller.

20. The system of claim 19, wherein the sensor comprises a radar device, a lidar device, or an image capture device.

21. The system of claim 18, wherein the respective group of the output devices includes the receiving UWB radio.

22. The system of claim 18, wherein at least one output device in the respective group of the output devices comprises an actuator that the zonal controller instructs to perform an action.

23. The system of claim 18, wherein the zonal controller is in communication with a master controller of the vehicle and another zonal controller of the vehicle, the other zonal controller of the vehicle in communication with another respective group of output devices associated with another specific zone of the vehicle.

24. The system of claim 23, wherein the master controller maintains the master clock and comprises the transmitting UWB radio that transmits the sequence of one or more synchronization packets.

25. The system of claim 24, wherein the other respective group of output devices associated with the other specific zone of the vehicle comprises another receiving UWB radio associated with the other zonal controller of the vehicle, the another receiving UWB radio configured to capture each corresponding synchronization packet in the sequence of one or more synchronization packets transmitted by the transmitting UWB radio.

26. The system of claim 23, wherein:
the master clock comprises a respective internal clock of the other zonal controller; and
the other respective group of output devices associated with the other specific zone of the vehicle includes the transmitting UWB radio that transmits the sequence of one or more synchronization packets captured by the receiving UWB radio.

* * * * *